Patented Oct. 19, 1926.

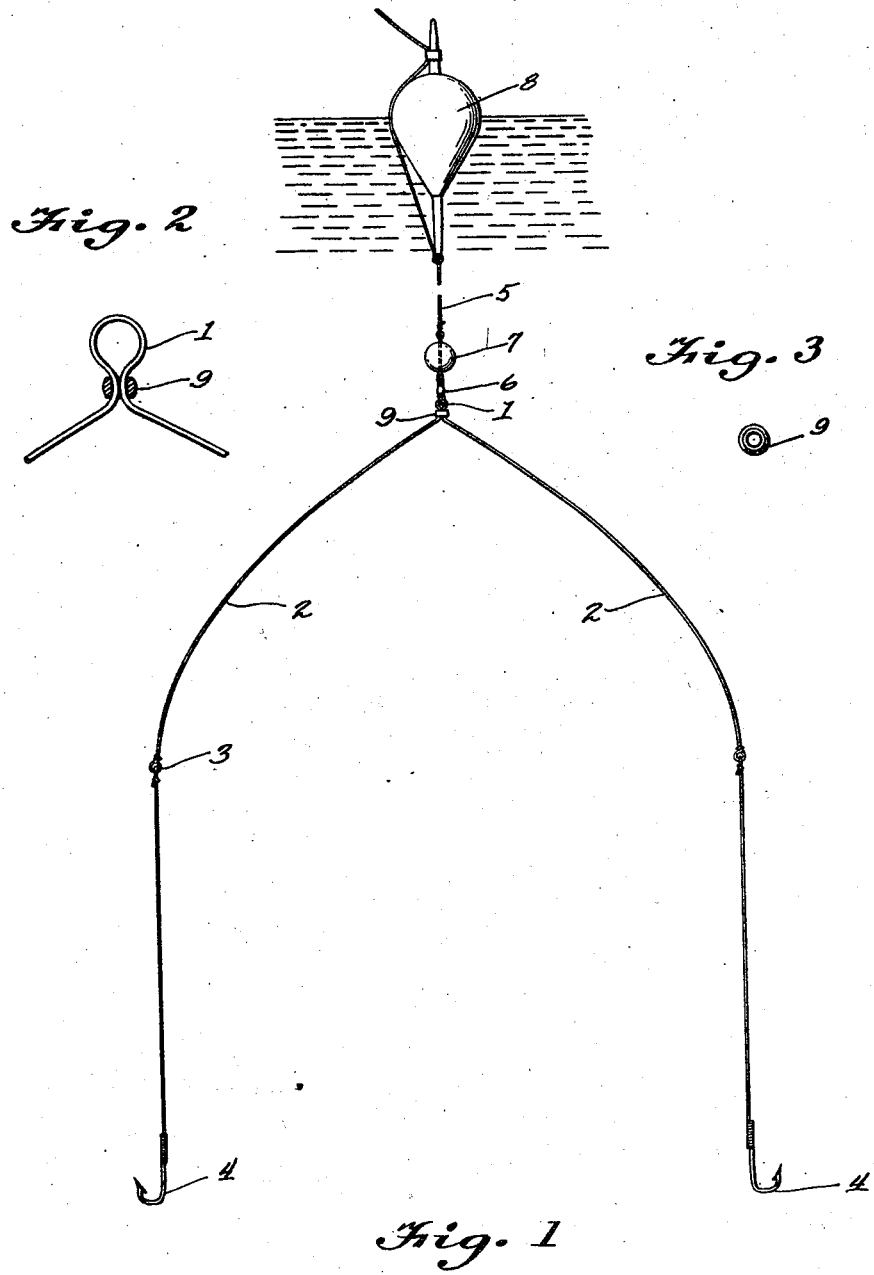

1,603,293

UNITED STATES PATENT OFFICE.

JOSEPH E. PFLUEGER, OF AKRON, OHIO, ASSIGNOR TO THE ENTERPRISE MANUFACTURING COMPANY, OF AKRON, OHIO, A CORPORATION OF OHIO.

LINE SPREADER.

Application filed March 23, 1922. Serial No. 546,015.

This invention relates to line spreaders such as are used for securing a plurality of hooks to a single fishing line with said hooks spread to avoid conflict. The invention has particular relation to that portion of the spreader where it is attached to the fishing line, its object being to provide an improved form of line attaching eye which can be made in a simple manner and at low cost without any necessity or liability of twisting the wire, forming sharp bends therein, or attaching special parts for connection of the line.

More specifically, the invention has for its object to provide a line spreader formed from a single piece of wire bent to form an eye, together with a bead or ring surrounding the arms of the spreader adjacent the eye and thereby closing the eye and maintaining its form.

In the drawings, Fig. 1 represents a line spreader embodying my invention and attached to a fishing line; Fig. 2 is a detail sectional view of the line attaching eye; and Fig. 3 is a plan view of a bead or ring.

The line spreader shown in the drawings is made from a single piece of strong, resilient wire, such as steel piano wire, bent intermediate its ends to form an eye 1 from which extend two diverging arms 2 suitably formed at their free ends with means for attaching hooks thereto. For example, the wire at the free end of each arm can be bent to form a closed eye 3 to which the leader of the fishing hook 4 is attached. The eye 1 is provided for connecting the spreader to a fishing line 5, in which is usually located a swivel 6, a weight 7 and which may be provided wth a float 8 if desired.

To maintain the eye 1 closed and enable said eye to be formed without sharp bends or twists in the wire, the eye is closed by slipping over the parallel arms 2, prior to formation of the loops 3 and before said arms are spread, a small ring or bead 9, which is pushed up close to the eye, as shown in Fig. 2, after which the wire of the arms is bent to spread the latter. The diverging arms hold the ring or bead in place and said bead prevents the swivel or other line attaching device from working out along either arm or from otherwise escaping from the eye. Usually the inner surface of the bead is slightly curved in contour so that where the wire of the spreader is drawn through said bead it can be curved gradually without the necessity of sharp bends or angles.

The spreader may, of course, be used in various ways, either for fishing in still water with a float, as shown in the drawings, or for trolling or casting purposes. Indeed, it may be used in any case where it is desired to attach two hooks or baits to a single line without interference between them.

The foregoing arrangement provides a line attaching eye for a spreader which can be made simply and at low cost. It avoids twisting the wire with consequent crystallization of the metal and liability of breakage and also avoids any necessity of attaching a line securing device to the spreader.

Having described my invention, I claim:

A fish line spreader, comprising a single relatively fine wire bent intermediate its ends to form a line attaching eye and diverging hook receiving arms, said parts at and adjacent said eye being free of portions which cross or intersect, and a ring embracing the wire of said arms adjacent said eye and closing the latter, the divergence of said arms being of such extent that said ring is normally maintained adjacent the eye at all times after the initial assembly of the device.

In testimony whereof I hereby affix my signature.

JOSEPH E. PFLUEGER.